(12) United States Patent
Sugita et al.

(10) Patent No.: US 11,223,774 B2
(45) Date of Patent: Jan. 11, 2022

(54) IMAGING APPARATUS, LENS APPARATUS, AND METHOD FOR CONTROLLING THE SAME

(71) Applicant: CANON KABUSHIKI KAISHA, Tokyo (JP)

(72) Inventors: Atsushi Sugita, Yokohama (JP); Takeshi Ogawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 38 days.

(21) Appl. No.: 16/181,967

(22) Filed: Nov. 6, 2018

(65) Prior Publication Data
US 2019/0149739 A1 May 16, 2019

(30) Foreign Application Priority Data

Nov. 16, 2017 (JP) .............................. JP2017-221284

(51) Int. Cl.

| | |
|---|---|
| *H04N 5/232* | (2006.01) |
| *H04N 5/225* | (2006.01) |
| *G02B 7/09* | (2021.01) |
| *G02B 7/28* | (2021.01) |
| *H04N 5/77* | (2006.01) |

(Continued)

(52) U.S. Cl.
CPC ........... *H04N 5/23296* (2013.01); *G02B 7/09* (2013.01); *G02B 7/282* (2013.01); *H04N 5/2254* (2013.01); *H04N 5/23212* (2013.01); *H04N 5/772* (2013.01); *H04N 9/8205* (2013.01); *H04N 5/23293* (2013.01); *H04N 5/76* (2013.01)

(58) Field of Classification Search
CPC .. H04N 5/23296; H04N 9/8205; H04N 5/772; H04N 5/2254; H04N 5/23212; H04N 5/23293; H04N 5/76; H04N 5/217; H04N 5/23209; G02B 7/282; G02B 7/09
See application file for complete search history.

(56) References Cited

U.S. PATENT DOCUMENTS

2010/0232775 A1* 9/2010 Okamoto ............... G03B 17/00
396/81
2012/0050603 A1 3/2012 Imaoka
(Continued)

FOREIGN PATENT DOCUMENTS

| CN | 1971398 A | 5/2007 |
|---|---|---|
| CN | 101489120 A | 7/2009 |

(Continued)

*Primary Examiner* — Lin Ye
*Assistant Examiner* — Tuan H Le
(74) *Attorney, Agent, or Firm* — Canon U.S.A., Inc. IP Division

(57) ABSTRACT

A lens apparatus having a focus lens can be detachably attached to an imaging apparatus. A sensor of the imaging apparatus photoelectrically converts an optical image formed via the lens apparatus. A generation unit generates an image based on an image signal output from the imaging apparatus. The imaging apparatus receives information about a focal length variation from the lens apparatus received by a lens communication control unit configured to control communication with the lens apparatus, and an image magnification variation correction control unit corrects the magnification of the image based on the information.

25 Claims, 7 Drawing Sheets

(51) Int. Cl.
*H04N 9/82* (2006.01)
*H04N 5/76* (2006.01)

(56) References Cited

U.S. PATENT DOCUMENTS

| | | | | |
|---|---|---|---|---|
| 2014/0169778 A1* | 6/2014 | Nakakusu | ............... | H04N 5/232 |
| | | | | 396/82 |
| 2015/0244944 A1* | 8/2015 | Tokutake | ........... | H04N 5/23293 |
| | | | | 348/239 |
| 2016/0366324 A1* | 12/2016 | Nakata | ................. | H04N 5/2352 |
| 2017/0276902 A1* | 9/2017 | Umezawa | ................. | G02B 7/09 |
| 2019/0377166 A1* | 12/2019 | Komatsu | ................. | G02B 15/17 |

FOREIGN PATENT DOCUMENTS

| | | | |
|---|---|---|---|
| CN | 102891959 | A | 1/2013 |
| CN | 103424850 | A | 12/2013 |
| CN | 103581546 | A | 2/2014 |
| CN | 104270571 | A | 1/2015 |
| CN | 106254787 | A | 12/2016 |
| JP | 11-023949 | A | 1/1999 |
| JP | 2008-040008 | A | 2/2008 |
| JP | 2008-042405 | A | 2/2008 |
| JP | 2008-134390 | A | 6/2008 |
| JP | 04836320 | B2 | 12/2011 |
| JP | 5013705 | B2 | 8/2012 |
| JP | 2016-136271 | A | 7/2016 |

* cited by examiner

FIG.5

| FACTORS | | | ACTUAL FOCAL LENGTH VARIATION RATE INFORMATION | |
|---|---|---|---|---|
| ZOOM | DIAPHRAGM | FOCUS | ACTUAL FOCAL LENGTH | MAXIMUM ACTUAL FOCAL LENGTH |
| Zm_0 | Av_0 | Fcs_0 | FL_000 | MaxFL_00 |
| | | ... | ... | |
| | | Fcs_z | FL_00z | |
| | ... | ... | ... | ... |
| | Av_y | Fcs_0 | FL_0y0 | MaxFL_0y |
| | | ... | ... | |
| | | Fcs_z | FL_0yz | |
| ... | ... | ... | ... | ... |
| Zm_x | Av_0 | Fcs_0 | FL_x00 | MaxFL_00 |
| | | ... | ... | |
| | | Fcs_z | FL_x0z | |
| | ... | ... | ... | ... |
| | Av_x | Fcs_0 | FL_xy0 | MaxFL_0y |
| | | ... | ... | |
| | | Fcs_z | FL_xyz | |

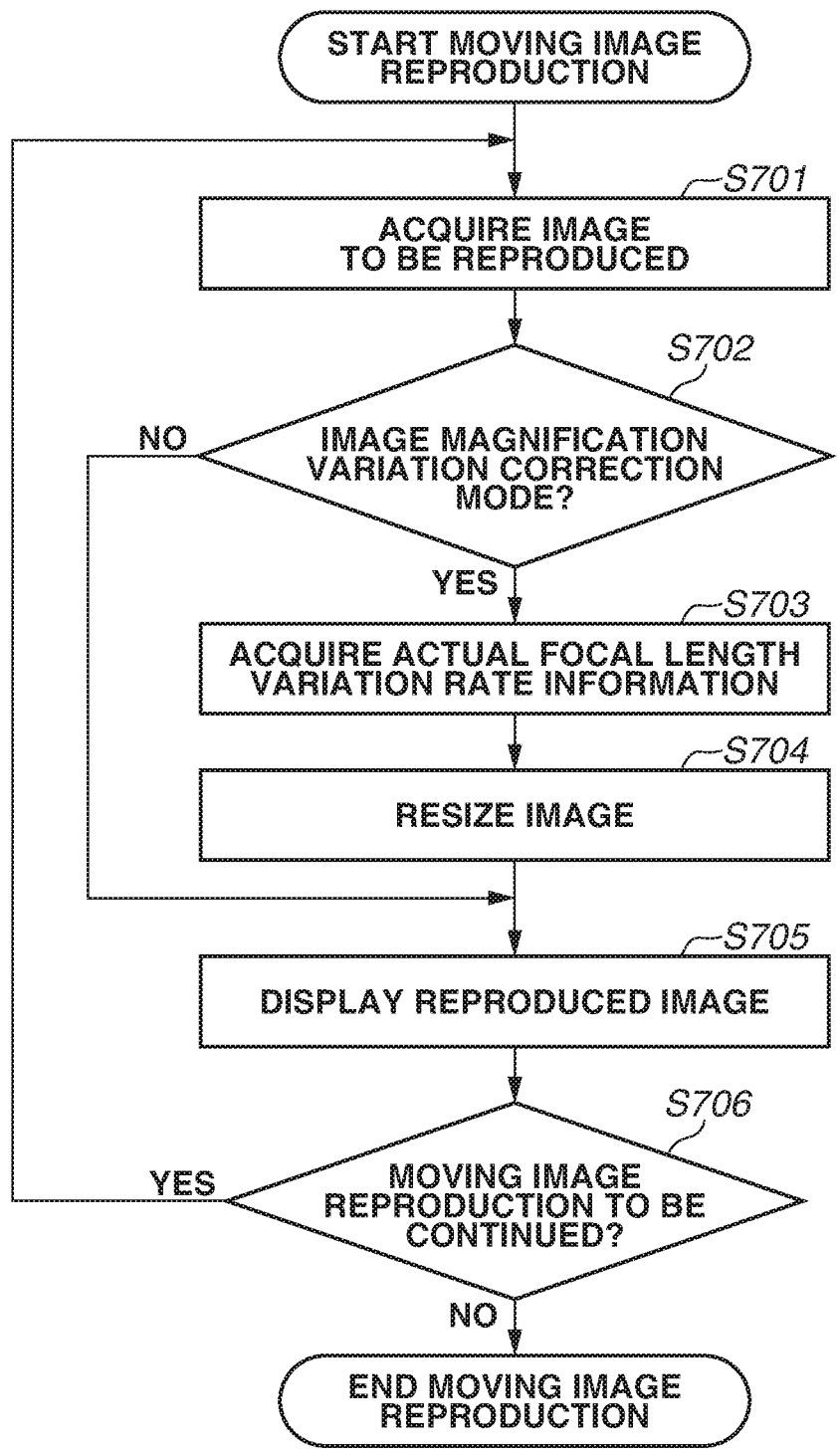

IMAGING APPARATUS, LENS APPARATUS, AND METHOD FOR CONTROLLING THE SAME

BACKGROUND OF THE INVENTION

Field of the Invention

The aspect of the embodiments relates to a technique for correcting the magnification of an image obtained by an imaging apparatus.

Description of the Related Art

It is known that, in an imaging apparatus such as a digital camera, a focal length (hereinafter referred to as an actual focal length) of an entire lens optical system changes an angle of view resulting in a variation of the magnification of a subject image formed on an image sensor. The actual focal length varies according not only to a zoom lens position but also to a focal position depending on a focus lens position. Therefore, the change of the focus lens position causes an angle-of-view variation.

Particularly at the time of moving image capturing, the angle-of-view variation will be recorded as a moving image, which may cause the degradation in a moving image quality. For this reason, there has been a demand for a technique for reducing the degradation of the moving image quality caused by the angle-of-view variation.

Japanese Patent No. 5013705 discusses a technique, in a camera system having a lens integrated with a camera, for correcting the magnification of each image based on the magnification set for each focal position of the focus lens so that the angle of view of each image captured and generated at each focal position is maintained constant.

Japanese Patent Application Laid-Open No. 2016-136271 discusses a technique, in a camera system having lenses interchangeable for a camera, for transmitting an image magnification variation value for a unit moving amount of a focus lens to the camera and not performing a wobbling operation when the magnification variation value is equal to or larger than a predetermined value.

According to the conventional technique discussed in Japanese Patent No. 5013705, it is possible to reduce the degradation of the moving image quality due to an angle-of-view variation in a camera system having a lens integrated with a camera. However, the technique discussed in Japanese Patent No. 5013705 does not take into consideration a camera system in which various lenses with different optical systems are interchangeable for the camera.

In the conventional technique discussed in Japanese Patent Application Laid-Open No. 2016-136271, the drive of the focus lens is only limited to make an angle-of-view variation unnoticeable, and therefore the angle-of-view variation does not disappear. Further, limiting the drive of the focus lens to make the angle-of-view variation unnoticeable reduces a driving speed of the focus lens.

SUMMARY OF THE INVENTION

The aspect of the embodiments is directed to providing an imaging apparatus capable of reducing the degradation of a moving image quality due to an angle-of-view variation, a lens apparatus, and a method for controlling these apparatuses, even in a camera system in which lenses are interchangeable for a camera.

According to an aspect of the embodiments, an imaging apparatus to which a lens apparatus having an attachable focus lens includes a sensor configured to photoelectrically convert an optical image formed via the lens apparatus, a generation unit configured to generate an image based on an image signal output from the sensor, a control unit configured to control communication with the lens apparatus, and a correction unit configured to correct a magnification of the image based on information received by the control unit. The control unit receives information about a focal length variation from the lens apparatus. The correction unit corrects the magnification of the image based on the information about the focal length variation.

According to another aspect of the embodiments, a lens apparatus attachable to an imaging apparatus includes an imaging optical system including a focus lens, a calculation unit configured to calculate correction information corresponding to the magnification to which an image output by a sensor included in the imaging apparatus is to be corrected based on a first focal length corresponding to the current position of the focus lens and a second focal length as a reference out of focal lengths which can be taken depending on the position of the focus lens, and a control unit configured to control communication to transmit the correction information to the imaging apparatus.

Further features of the disclosure will become apparent from the following description of exemplary embodiments with reference to the attached drawings.

BRIEF DESCRIPTION OF THE DRAWINGS

FIG. 5 illustrates an actual focal length variation rate information table according to the first exemplary embodiment of the disclosure.

FIG. 7 is a flowchart illustrating focus image magnification variation correction processing based on the actual focal length variation rate information recorded in a moving image file in an imaging apparatus according to the second exemplary embodiment of the disclosure.

DESCRIPTION OF THE EMBODIMENTS

Exemplary embodiments of the disclosure will be described in detail below with reference to the accompanying drawings.

A first exemplary embodiment of the disclosure is directed to an interchangeable camera-lens system mounting a focus image magnification variation correction function for correcting an angle-of-view variation due to a focus lens drive at the time of moving image capturing. Although, in this case, an imaging plane phase difference autofocus (AF) mode is assumed, the focus lens drive is not limited thereto. For example, contrast AF or manual focus is also applicable.

Figure 1:
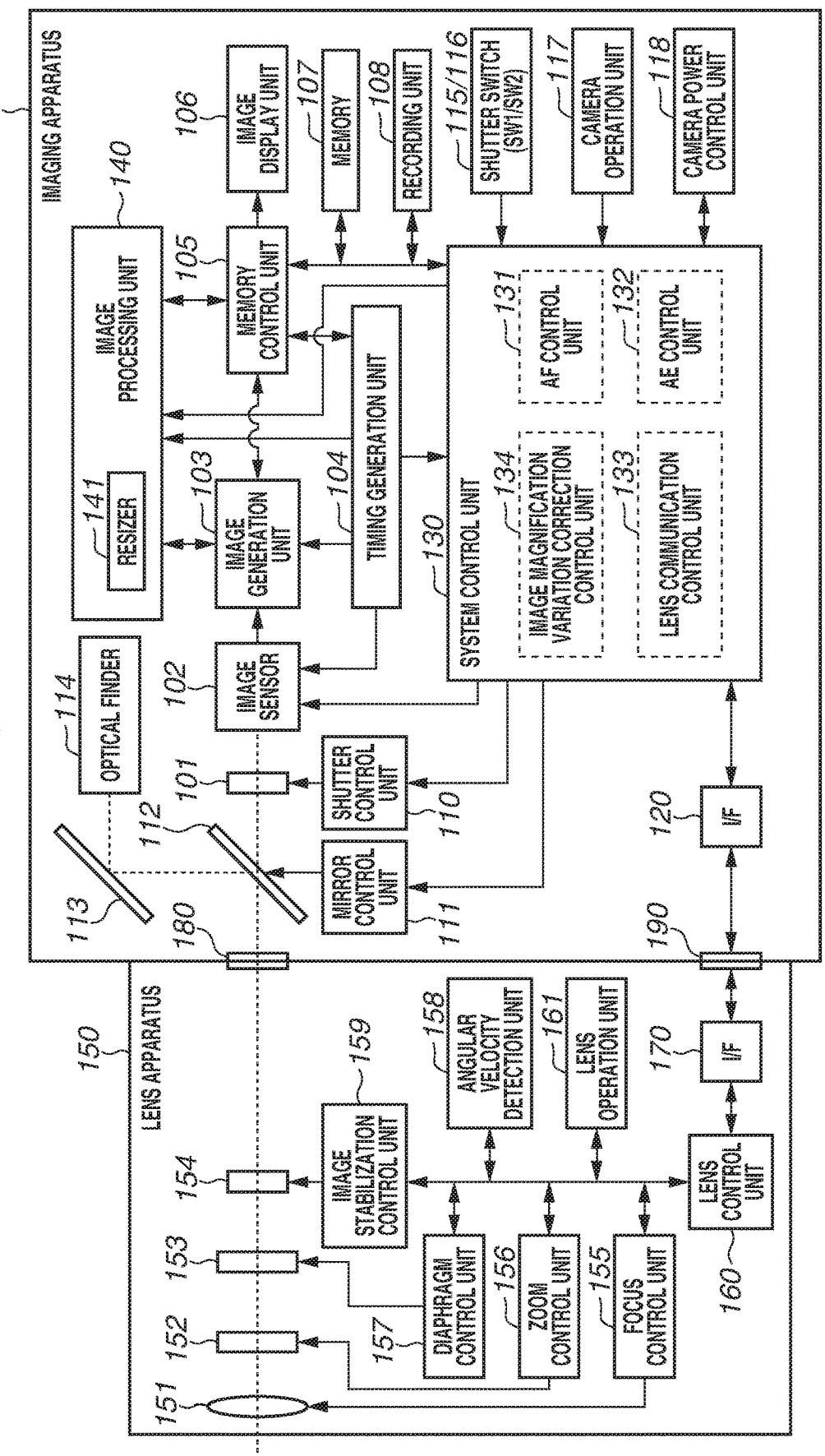
FIG. 1 is a block diagram illustrating an interchangeable camera-lens system according to an exemplary embodiment of the disclosure.

FIG. 1 is a block diagram illustrating a configuration of an interchangeable camera-lens system according to an exemplary embodiment of the disclosure.

As illustrated in FIG. 1, a lens apparatus 150 is detachably attached to an imaging apparatus 100 according to the present exemplary embodiment via a lens mount unit 180. The lens apparatus 150 attachable to the imaging apparatus 100 includes an imaging optical system composed of a focus lens 151, a zoom lens 152, a diaphragm 153, and an image stabilization control lens 154. Although one lens is illustrated in FIG. 1, a lens group including a plurality of lenses is also applicable. Light entering through the imaging optical system is led to an image sensor 102, and an optical image formed by the imaging optical system is formed on the image sensor 102.

A configuration of the imaging apparatus 100 will be described below.

The image sensor 102 composed of a charge coupled device (CCD) sensor or a complementary metal oxide semiconductor (CMOS) sensor photoelectrically converts a subject image formed by the lens apparatus 150 into an electric signal. The image sensor 102 may have a plurality of focus detection pixels.

An image generation unit 103 converts an analog output signal of the image sensor 102 into a digital signal to generate an image. The generated image is input to a memory control unit 105 and an image processing unit 140.

A timing generation unit 104 supplies a clock signal and a synchronization signal to the image sensor 102, the image generation unit 103, the memory control unit 105, a system control unit 130, and the image processing unit 140.

The memory control unit 105 controls the image generation unit 103, the timing generation unit 104, an image display unit 106, a memory 107, a recording unit 108, and the image processing unit 140. Output data from the image generation unit 103 is written in the memory 107 and the recording unit 108 via the image processing unit 140 and the memory control unit 105.

The image display unit 106 is composed of a liquid crystal display (LCD). An electronic view finder (EVF) successively displays image data captured using an external display apparatus (not illustrated) or the image sensor 102, achieving an EVF function. When reproducing an image, the image display unit 106 displays an image recorded in the memory 107 and the recording unit 108.

The memory 107 is used to store still images and moving images captured and is also used as a work space of the system control unit 130.

The recording unit 108, composed of a nonvolatile memory removable from the inside of the imaging apparatus 100 or from the imaging apparatus 100, stores still images and moving images captured.

A shutter control unit 110 controls a shutter 101 in cooperation with a mirror control unit 111 based on control signals from the system control unit 130.

The mirror control unit 111 controls a main mirror 112 based on control signals from the system control unit 130.

The main mirror 112 switches a destination of an incident light flux from the lens apparatus 150 between the finder and the image sensor sides. In the normal state, the main mirror 112 is disposed to reflect the light flux to guide it to the finder. In the imaging state, the main mirror 112 pops up to guide the light flux to the finder and retreats from the light flux. The center portion of the main mirror 112 is configured as a half mirror to transmit a part of light so that a part of the light flux is incident to a focus detection sensor (not illustrated) for performing focus detection.

A pentaprism 113 guides the incident light flux from the lens apparatus 150 to an optical finder 114.

The optical finder 114 is composed of a focusing plate (not illustrated) and an eyepiece lens.

A shutter switch 115 (hereinafter referred to as SW1) instructs the system control unit 130 to start AF processing, auto exposure (AE) processing, and auto white balance (AWB) processing.

The shutter switch 116 (hereinafter referred to as a SW2) instructs the system control unit 130 to start exposure. Upon reception of an exposure start command, the system control unit 130 controls the lens apparatus 150 via the image sensor 102, the memory control unit 105, the shutter control unit 110, the mirror control unit 111, and an interface (I/F) 120 to perform processing for recording image data in the recording unit 108.

A camera operation unit 117 includes various buttons, a touch panel, and a power ON/OFF button, and outputs an instruction received through a user operation to the system control unit 130. According to a user operation on the camera operation unit 117, the system control unit 130 performs various functions mounted on the imaging apparatus 100, such as operation mode switching between the AF and AE modes.

A camera power control unit 118 manages an external battery or an internal battery. In a case where the battery is removed or the remaining battery capacity runs out, the camera power control unit 118 performs urgent interception processing for camera control. At this timing, the system control unit 130 turns off the power supply to the lens apparatus 150.

The I/F 120 performs communication by using electrical signals between the system control unit 130 in the imaging apparatus 100 and a lens control unit 160 in the lens apparatus 150 via a connector 190. The I/F 120 receives information of the lens apparatus 150 and transmits control commands to the lens apparatus 150.

The system control unit 130 controls an entire camera including the image sensor 102, the memory control unit 105, the shutter control unit 110, and the mirror control unit 111 according to inputs from the SW1, the SW2, the memory control unit 105, and the camera operation unit 117. The system control unit 130 also controls the lens apparatus 150 via the I/F 120.

An AF control unit 131 provided in the system control unit 130 manages the AF processing of the imaging apparatus 100. In the AF processing, according to an AF mode, the system control unit 130 calculates a focus lens driving amount based on lens information (focus position and focal length) acquired from the lens apparatus 150 via the I/F 120, and an input AF evaluation value. The focus lens driving amount is input to the lens apparatus 150 via a lens communication control unit 133 and the I/F 120. For example, in a phase difference AF mode, the system control unit 130 calculates the focus lens driving amount based on a phase difference AF evaluation value acquired by inputting a subject's optical image to an in-focus state determination unit (not illustrated) via the main mirror 112 and a sub mirror for focus detection (not illustrated). In a contrast AF mode, the system control unit 130 calculates the focus lens driving amount based on a contrast AF evaluation value calculated by the image processing unit 140. In an imaging plane phase difference AF mode, the system control unit 130 calculates the focus lens driving amount based on an imaging plane phase difference AF evaluation value output from a plurality of focus detection pixels embedded in the image sensor 102. The system control unit 130 switches an AF frame position for evaluation value calculation according to AF evaluation modes including a one-point AF mode, a multi-point AF mode, and a face detection AF mode.

An AE control unit 132 provided in the system control unit 130 manages AE processing of the imaging apparatus 100. In the AE processing, according to an AE mode, the system control unit 130 calculates an AE control amount (including a diaphragm control amount, a shutter control amount, and an exposure sensitivity) based on lens information such as an open F value and a focal length acquired from the lens apparatus 150 via the I/F 120 and an input AE evaluation value. The diaphragm control amount is input to the lens apparatus 150 via the lens communication control unit 133 and the I/F 120. The shutter control amount is input to the shutter control unit 110, and the exposure sensitivity is input to the image sensor 102. For example, in a finder imaging mode, the system control unit 130 calculates the AE control amount based on the AE evaluation value acquired by inputting a subject's optical image to a brightness determination unit (not illustrated) via the main mirror 112 and the pentaprism 113. In a live view imaging mode, the system control unit 130 calculates the AE control amount based on the AE evaluation value calculated by the image processing unit 140. According to light measurement modes including an evaluation light measurement mode, an average light measurement mode, and a face detection light measurement mode, the system control unit 130 switches an AE frame position for evaluation value calculation and a weight amount.

The lens communication control unit 133 provided in the system control unit 130 manages communication between the imaging apparatus 100 and the lens apparatus 150. When the system control unit 130 detects the attachment of the lens apparatus 150 via the I/F 120, the imaging apparatus 100 and the lens apparatus 150 start communication. More specifically, the system control unit 130 receives the lens information from the lens apparatus 150 at an arbitrary timing, and transmits camera information and drive commands to the lens apparatus 150. For example, in the finder imaging mode, the imaging apparatus 100 performs communication with the lens apparatus 150 at an arbitrary timing under control of the system control unit 130. In the live view imaging mode, the imaging apparatus 100 can perform communication not only at an arbitrary timing but also at a timing based on an imaging synchronization signal output from the timing generation unit 104. In case of performing communication at a timing based on the imaging synchronization signal, the system control unit 130, upon input of the imaging synchronization signal from the timing generation unit 104, collectively receives the lens information (including a focus lens position, a focus lens state, a diaphragm state, and the focal length).

An image magnification variation correction control unit 134 receives, via the I/F 120, focal length variation rate information including a focal length variation rate at a current position of the focus lens 151 with respect to a maximum focal length which can be taken in a movable range of the focus lens 151 in the lens apparatus 150. Based on the received focal length variation rate information, the system control unit 130 calculates an angle-of-view correction magnification and sets the angle-of-view correction magnification to a resizer 141 in the image processing unit 140. Although, in this example, the maximum focal length which can be taken in the movable range of the focus lens 151 in the lens apparatus 150 is set as a reference, the reference is not limited thereto. A predetermined focal length can be set as a reference.

The image processing unit 140 performs predetermined pixel interpolation processing or color conversion processing on a digital image signal from the image generation unit 103 or data from the memory control unit 105 to generate image data. The image processing unit 140 also performs predetermined calculation processing by using the digital image signal.

A configuration of the lens apparatus 150 will be described below.

The focus lens 151 moves in an optical axis direction to change a focus of the imaging optical system.

The zoom lens 152 moves in the optical axis direction to change a focal length of the imaging optical system.

The diaphragm 153 having a variable aperture diameter (diaphragm value) changes a light quantity according to the aperture diameter.

The image stabilization control lens 154 moves in a direction perpendicularly intersecting with the optical axis direction to reduce an image shake due to a camera shake.

A focus control unit 155 is controlled by the lens control unit 160 or the lens operation unit 161, and drives the focus lens 151. The focus control unit 155 outputs focus information such as a position of the focus lens 151 to the lens control unit 160.

A zoom control unit 156 is controlled by the lens control unit 160 or the lens operation unit 161, and drives the zoom lens 152. The zoom control unit 156 outputs zoom information such as a focal length to the lens control unit 160.

A diaphragm control unit 157 is controlled by the lens control unit 160 or the lens operation unit 161, and drives the diaphragm 153. The diaphragm control unit 157 outputs diaphragm information such as a diaphragm value to the lens control unit 160.

An angular velocity detection unit 158 is controlled by the lens control unit 160, and detects a lens angular velocity (yaw and pitch) to output the lens angular velocity to the lens control unit 160.

An image stabilization control unit 159 is controlled by the lens control unit 160, and drives the image stabilization control lens 154. The image stabilization control unit 159 outputs image stabilization information such as an image stabilization possible range to the lens control unit 160.

According to an input from the lens operation unit 161 or the input from an I/F 170, the lens control unit 160 controls the focus control unit 155, the zoom control unit 156, the diaphragm control unit 157, the angular velocity detection unit 158, and the image stabilization control unit 159 to control the entire lenses. According to a lens information acquisition command received by the I/F 170, the lens control unit 160 transmits information input from each control unit and detection unit to the imaging apparatus 100 via the I/F 170. The lens control unit 160 also calculates the maximum focal length which can be taken in the movable range of the focus lens 151 and the focal length variation rate at the current position of the focus lens 151. At this timing, the lens control unit 160 uses the focus information and the zoom information output from the focus control unit 155 and the zoom control unit 156, respectively. Then, the lens control unit 160 transmits the calculation results to the imaging apparatus 100 via the I/F 170. In this case, the lens control unit 160 can transmit the calculation results of the maximum focal length and the focal length variation rate as a response to a request from the imaging apparatus 100.

The lens operation unit 161 includes a focus operation ring, a zoom operation ring, an AF/manual focus (MF) switch, and an Image Stabilizer (IS) ON/OFF switch, and outputs to the lens control unit 160 an instruction received through a user operation. Based on the instruction input from the lens operation unit 161, the lens control unit 160 transmits a content of the user operation to the imaging apparatus 100 via the I/F 170. The system control unit 130 in the imaging apparatus 100 receives the content of the user operation via the I/F 120, and performs operation mode switching for various functions mounted on the lens apparatus 150.

The I/F 170 performs communication between the system control unit 130 in the imaging apparatus 100 and the lens control unit 160 in the lens apparatus 150 by using electrical signals via the connector 190 to transmit information of the lens apparatus 150 and receive control commands.

Figure 2:
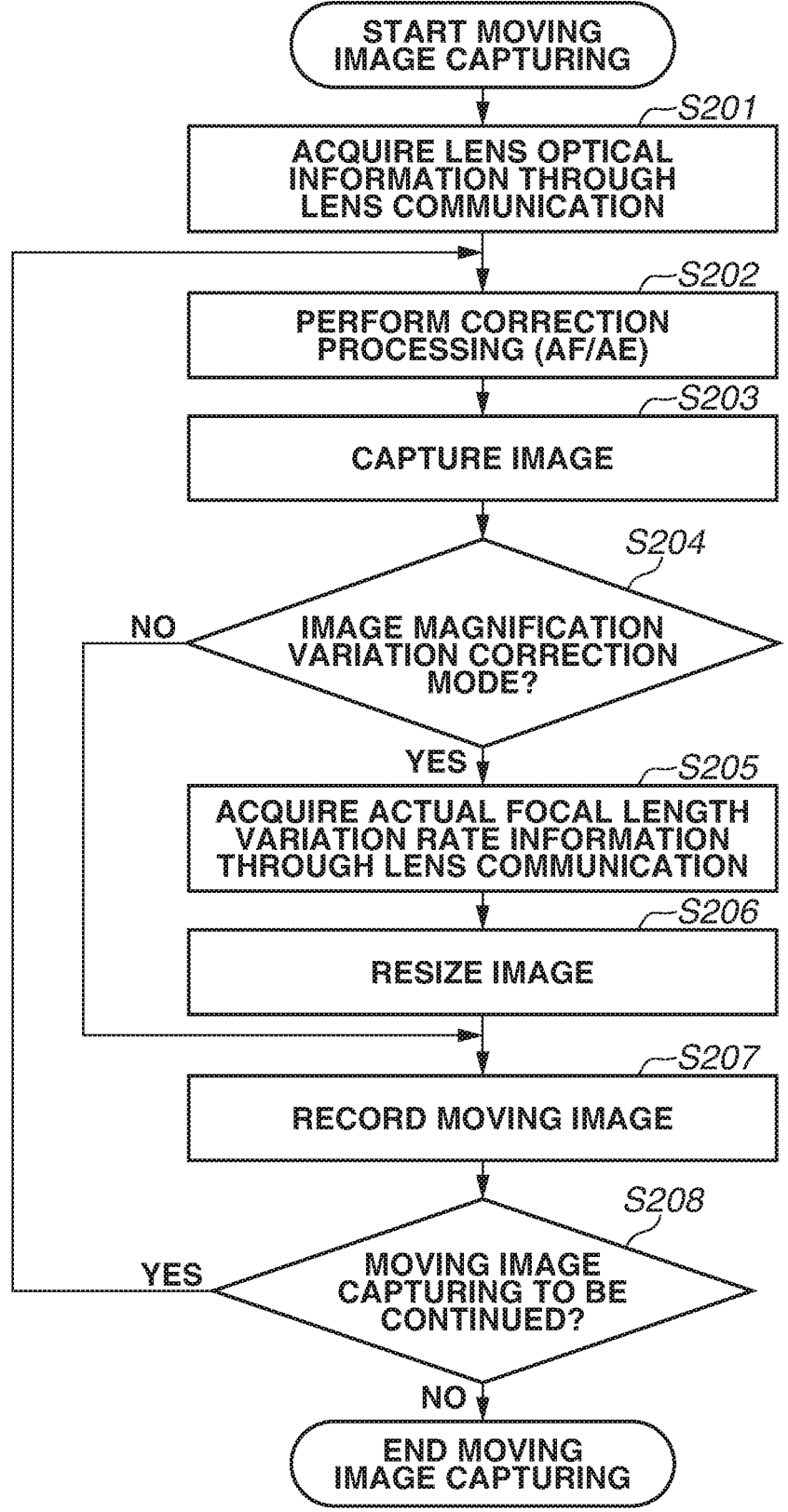
FIG. 2 is a flowchart illustrating a flow of focus image magnification variation correction processing of an interchangeable camera-lens system according to a first exemplary embodiment of the disclosure.

Focus image magnification variation correction processing of the imaging apparatus 100 and the lens apparatus 150 according to the present exemplary embodiment will be described below with reference to a flowchart illustrated in FIG. 2. Moving image capturing start processing is performed when the imaging apparatus 100 starts moving image capturing.

In step S201, the system control unit 130 acquires lens optical information from the lens apparatus 150 via the I/F 120. Then, the processing proceeds to step S202. The lens optical information includes lens capabilities such as a focal length, a diaphragm, and the presence or absence of a camera shake correction function. The system control unit 130 may acquire actual focal length variation rate information (described below).

In step S202, the system control unit 130 controls the AF control unit 131 and the AE control unit 132 to perform correction processing such as the AF processing and the AE processing. Then, the processing proceeds to step S203. In the AF processing and the AE processing, the system control unit 130 calculates a lens control amount based on the above-described lens optical information and the lens information acquired from the lens apparatus 150 as required, and performs communication with the lens apparatus 150 to transmit a control command thereto. Although the AF processing according to the present exemplary embodiment assumes the imaging plane phase difference AF mode, the AF processing is not limited thereto. For example, the AF processing can also assume the contrast AF mode.

In step S203, the system control unit 130 performs image capture processing for acquiring image data. Then, the processing proceeds to step S204. The image data is acquired via the image sensor 102 and the image generation unit 103, and is recorded in the memory 107 via the image processing unit 140 and the memory control unit 105.

In step S204, the system control unit 130 determines whether the current mode is a focus image magnification variation correction mode. In a case where the current mode is the focus image magnification variation correction mode (YES in step S204), the processing proceeds to step S205. On the other hand, in a case where the current mode is not the focus image magnification variation correction mode (NO in step S204), the processing proceeds to step S207.

In step S205, the system control unit 130 acquires the actual focal length variation rate information (also referred to as correction information) from the lens apparatus 150 via the I/F 120. Then, the processing proceeds to step S206. The actual focal length variation rate information is different from an image magnification variation value with respect to a unit moving amount of the focus lens used to limit a focus lens driving speed in the conventional technique. The actual focal length variation rate information is used to obtain a variation rate (actual focal length variation rate) of a focal length (hereinafter referred to as an actual focal length) in the existing imaging optical system with respect to the maximum focal length (hereinafter referred to as the maximum actual focal length) which can be taken in the movable range of the focus lens 151.

The actual focal length variation rate is calculated by the following equation (1).

$$\text{Actual focal length variation rate} = (\text{Actual focal length})/(\text{Maximum actual focal length}) \quad (1)$$

Although, as an exemplary embodiment, the lens apparatus 150 calculates the actual focal length variation rate and transmits the actual focal length variation rate information including the actual focal length variation rate to the imaging apparatus 100, the processing is not limited thereto.

For example, as another exemplary embodiment, the lens apparatus 150 can transmit the actual focal length variation rate information including the maximum actual focal length and the actual focal length to the imaging apparatus 100, and the imaging apparatus 100 can calculate the actual focal length variation rate.

As still another exemplary embodiment, in step S201, the lens apparatus 150 transmits to the imaging apparatus 100 optical system state information for enabling calculating the actual focal length, the maximum actual focal length, or the actual focal length variation rate. In step S204, the lens apparatus 150 transmits the current optical state information to the imaging apparatus 100. The imaging apparatus 100 can calculate the actual focal length variation rate in this way. In this case, the optical state information includes position information of the focus lens, the diaphragm, and the zoom lens.

In step S206, based on the actual focal length variation rate information, the system control unit 130 calculates an image size correction magnification for correcting the angle-of-view variation due to the focus lens drive. Then, the system control unit 130 controls the image processing unit 140 based on the image size correction magnification to perform resize processing on the image data recorded in the memory 107. Then, the processing proceeds to step S207.

In step S207, the system control unit 130 records, as a moving image file, the image data recorded in the memory 107. Then, the processing proceeds to step S208.

In step S208, the system control unit 130 determines whether the moving image capturing is to be continued. When the moving image capturing is to be continued (YES in step S208), the processing proceeds to step S202. On the other hand, when the moving image capturing is not to be continued (NO in step S208), the system control unit 130 ends the moving image capture processing.

The above-described processing allows the interchangeable camera-lens system to achieve the focus image magnification variation correction processing at the time of moving image capturing.

Figure 3:
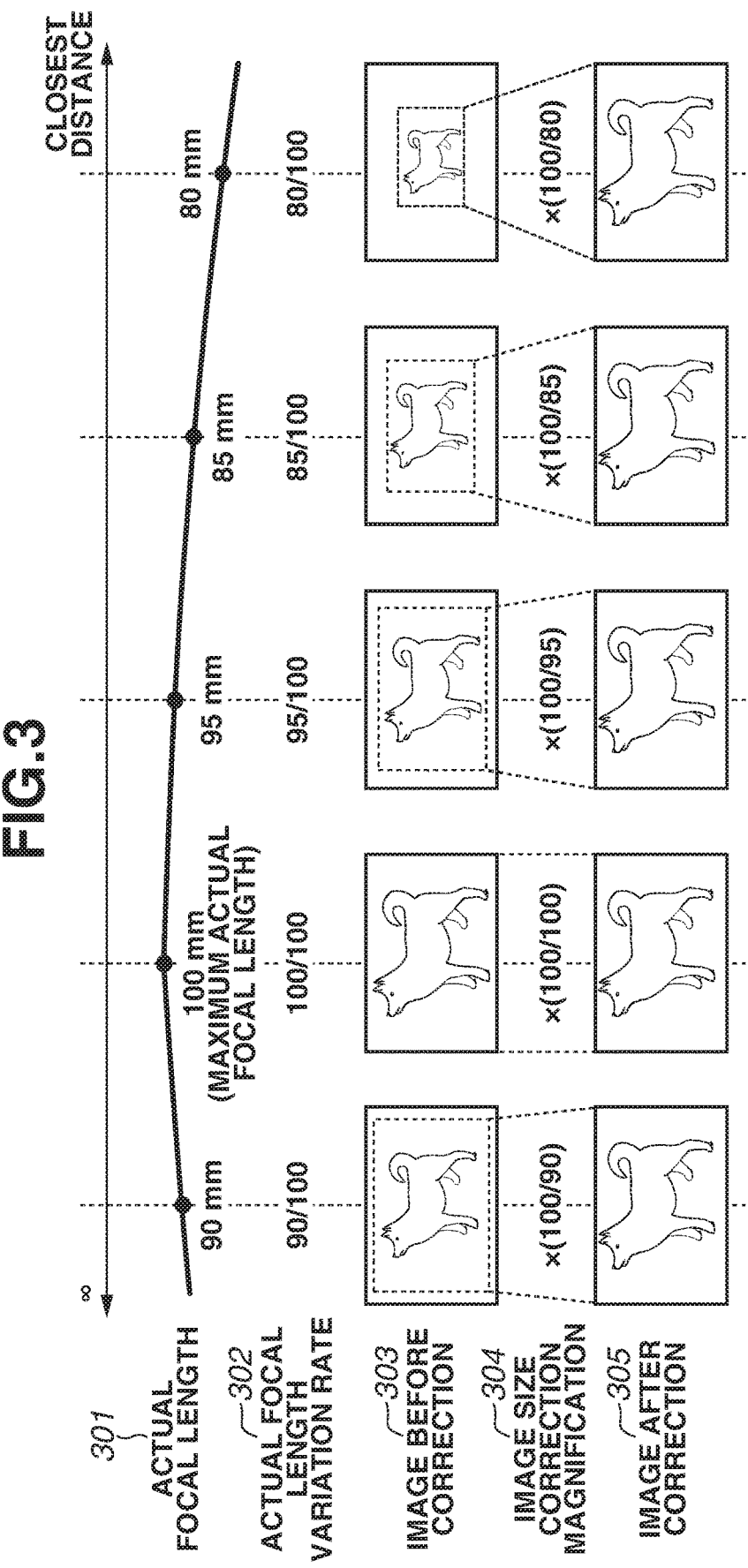
FIG. 3 is an image view illustrating effects of the focus image magnification variation correction processing of the interchangeable camera-lens system according to the first exemplary embodiment of the disclosure.

Effects of the focus image magnification variation correction processing by the interchangeable camera-lens system according to the present exemplary embodiment will be described below with reference to images illustrated in FIG. 3.

An actual focal length 301 drawn as a line indicates an example of the actual focal length which can be taken in the movable range of the focus lens from infinity to the closest distance when the lens apparatus 150 is set at an arbitrary zoom position in an arbitrary diaphragm state. The actual focal length maximized in this case is referred to as a maximum actual focal length.

An actual focal length variation rate 302 indicates an example of a value of the actual focal length variation rate at an arbitrary focus lens position.

An image before correction 303 indicates an example of an image captured at an arbitrary focus lens position. More specifically, examples of states in which the angle of view varies by the actual focal length changing at different focus lens positions even with the same subject at the same distance.

An image size correction magnification 304 indicates an example of an image size correction magnification calculated based on the actual focal length variation rate. Although, in the present exemplary embodiment, the reciprocal of the actual focal length variation rate is considered as the image size correction magnification, the image size correction magnification is not limited thereto. For example, an arbitrary coefficient can be applied to the reciprocal.

An image after correction 305 (also referred to as a correction image) indicates an example of an image before correction having undergone the resize processing based on the image size correction magnification. This resize processing is referred to as the focus image magnification variation correction processing.

As illustrated by the above-described effects, an interchangeable camera-lens system capable of improving the moving image quality can be achieved by performing the focus image magnification variation correction processing.

Figure 4:
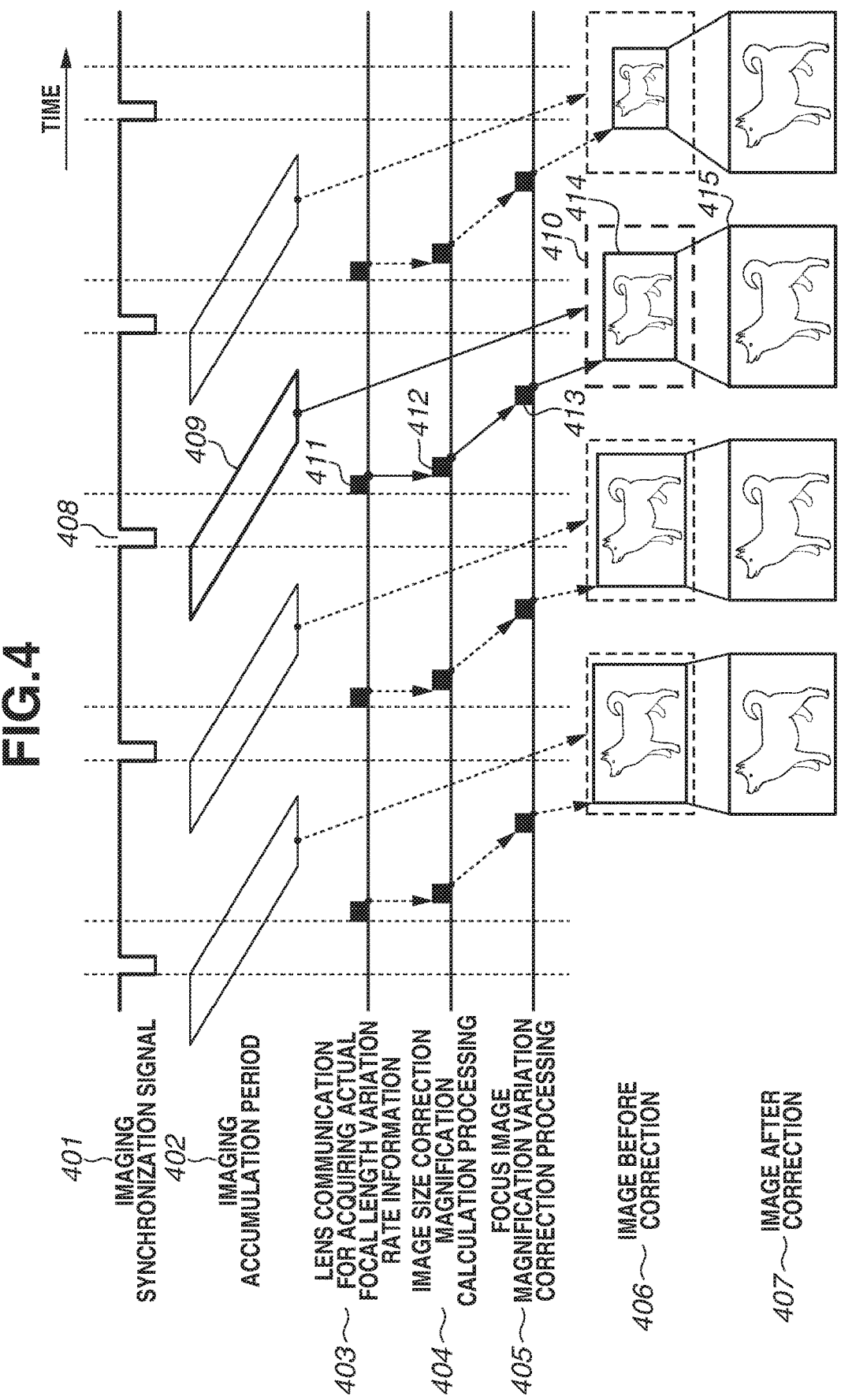
FIG. 4 is a timing chart illustrating the focus image magnification variation correction processing of an imaging apparatus and a lens apparatus according to the first exemplary embodiment of the disclosure.

Timings in the focus image magnification variation correction processing of the interchangeable camera-lens system according to the present exemplary embodiment will be described below with reference to a timing chart illustrated in FIG. 4.

An imaging synchronization signal 401 is a synchronization signal output by the timing generation unit 104.

An imaging accumulation period 402 is an accumulation period of the image sensor 102. The system control unit 130 starts reading sequentially from the top of a screen downward in response to the imaging synchronization signal 401.

Lens communication for acquiring actual focal length variation rate information 403 indicates the timing for performing lens communication for acquiring the actual focal length variation rate information from the lens apparatus 150 in step S205.

Image size correction magnification calculation processing 404 indicates the timing for calculating the image size correction magnification performed in step S206.

Focus image magnification variation correction processing 405 indicates the timing for performing the resize processing in step S206.

An image-before-correction 406 indicates an image not having undergone the focus image magnification variation correction, output from the image sensor 102.

An image-after-correction 407 indicates an image formed by applying the focus image magnification variation correction to the image-before-correction 406.

For example, upon reception of an imaging synchronization signal 408, the image sensor 102 outputs an image accumulated for an imaging accumulation period 409, and an image-before-correction 410 is obtained. The actual focal length variation rate information corresponding to the image-before-correction 410 can be acquired when lens communication for acquiring actual focal length variation rate information 411 is performed at a timing of the center (exposure center) of the imaging accumulation period 409. The image size correction magnification to be applied to the image-before-correction 410 is calculated when image size correction magnification calculation processing 412 is performed based on the acquired actual focal length variation rate information. Then, when the resize processing is performed in the focus image magnification variation correction processing 413, an area image 414 in the image-before-correction 410 is clipped and the image-after-correction 407 is output.

Repeating the above-described processing enables acquiring the image size correction magnification with which the imaging accumulation period coincides with the timing of the actual focal length variation rate information, thus achieving the focus image magnification variation correction processing.

An actual focal length variation rate information table used to acquire the actual focal length variation rate information according to the present exemplary embodiment will be described below with reference to a table illustrated in FIG. 5.

The lens apparatus 150 according to the present exemplary embodiment has the above-described actual focal length variation rate information table. When the lens apparatus 150 calculates the actual focal length variation rate information based on the imaging optical system state and the actual focal length variation rate information table to transmit the information to the imaging apparatus 100, the imaging apparatus 100 can calculate the image size correction magnification and, at the same time, achieve the focus image magnification variation correction processing.

A column 501 indicates factors for deriving (identifying) the actual focal length variation rate information. Each factor indicates position information of each member of the imaging optical system of the lens apparatus 150.

A column 502 indicates the actual focal length variation rate information derived by factors.

A column 503 indicates a position of the zoom lens 152 out of factors.

A column 504 indicates a position of the diaphragm 153 out of factors.

A column 505 indicates a position of the focus lens 151 out of factors.

A column 506 indicates the actual focal length out of the actual focal length variation rate information derived by each factor.

A column 507 indicates the maximum actual focal length out of the actual focal length variation rate information derived by each factor.

For example, assume that the position of the zoom lens 152 is Zm_0 (508), the position of the diaphragm 153 is Av_0 (509), and the position of the focus lens 151 is Fcs_0 (510). In this case, since the actual focal length becomes FL_000 (511) and the maximum actual focal length becomes MaxFL_00 (512), the actual focal length variation rate can be calculated by the equation (1).

The position information of the imaging optical system member as a factor is not limited thereto. For example, the position information can include a position of the image stabilization control lens 154.

The actual focal length variation rate information is not limited thereto as long as the actual focal length variation rate can be calculated. For example, the position information can include the actual focal length variation rate.

The lens apparatus 150 can transmit the actual focal length variation rate information table to the imaging apparatus 100. In this case, the lens apparatus 150 transmits the position information of the imaging optical system members to the imaging apparatus 100, and the imaging apparatus 100 searches for data in the actual focal length variation rate information table.

The actual focal length variation rate information can be acquired by providing the above-described actual focal length variation rate information table.

According to the above-described exemplary embodiment, it is possible to transmit from the lens apparatus 150 to the imaging apparatus 100 the actual focal length variation rate information for enabling calculating an amount of angle-of-view variation accompanying the actual focal length variation due to the focus lens drive. This makes it possible to achieve an interchangeable camera-lens system mounting the focus image magnification variation correction function that enables correcting the angle-of-view variation due to the focus lens drive for a captured image.

A second exemplary embodiment of the disclosure having a similar configuration to the above-described first exemplary embodiment is directed to an interchangeable camera-lens system in which the focus image magnification variation correction is possible for a captured moving image file. The first exemplary embodiment is characterized in that image data having undergone the resize processing is recorded in memory. However, there is a demand for recording a moving image file not having undergone the focus image magnification variation correction and then performing the focus image magnification variation correction on the moving image file. In addition, there is a demand for performing the focus image magnification variation correction even with a moving image reproduction apparatus other than an imaging apparatus.

Taking the above points into consideration, the second exemplary embodiment will be described below centering on the interchangeable camera-lens system according to the first exemplary embodiment, which is characterized in that the actual focal length variation rate information at the time of moving image capturing is recorded in a moving image file.

Figure 6:
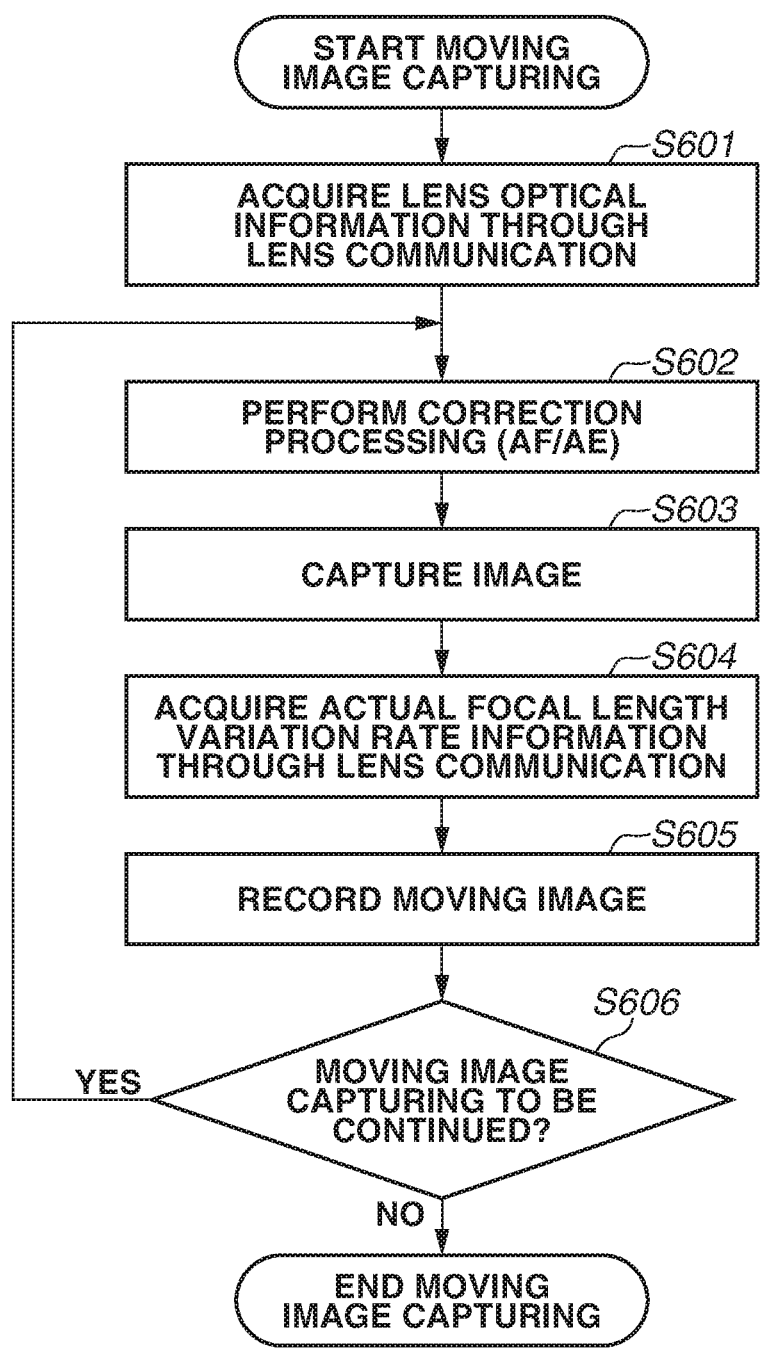
FIG. 6 is a flowchart illustrating a flow of processing for recording actual focal length variation rate information in a moving image file in an interchangeable camera-lens system according to a second exemplary embodiment of the disclosure.

Processing performed by the imaging apparatus 100 and the lens apparatus 150 to record the actual focal length variation rate information at the time of moving image capturing in a moving image file according to the present exemplary embodiment will be described below with reference to a flowchart illustrated in FIG. 6. Moving image capturing start processing is performed when the imaging apparatus 100 starts moving image capturing.

Step S601 is similar to step S201 and the redundant description thereof will be omitted.

Step S602 is similar to step S202 and the redundant description thereof will be omitted.

Step S603 is similar to step S203 and the redundant description thereof will be omitted.

Step S604 is similar to step S205 and the redundant description thereof will be omitted.

In step S605, the system control unit 130 adds the actual focal length variation rate information to the image data recorded in the memory 107, and records the image data as a moving image file in the memory 107. Then, the processing proceeds to step S606.

Step S606 is similar to step S208 and the redundant description thereof will be omitted.

The above-described processing allows the interchangeable camera-lens system to record the actual focal length variation rate information at the time of moving image capturing in a moving image file.

The focus image magnification variation correction processing performed by the imaging apparatus 100 according to the present exemplary embodiment at the time of moving image reproduction will be described below with reference to the flowchart illustrated in FIG. 7. Moving image reproduction processing is performed when the imaging apparatus 100 starts moving image reproduction.

In step S701, the system control unit 130 acquires image data to be displayed in a subsequent frame from the moving image file recorded in the recording unit 108, and records the image data in the memory 107. Then, the processing proceeds to step S702.

In step S702, the system control unit 130 determines whether the current mode is the focus image magnification variation correction mode. In a case where the current mode is the focus image magnification variation correction mode (YES in step S702), the processing proceeds to step S703. On the other hand, in a case where the current mode is not the focus image magnification variation correction mode (NO in step S702), the processing proceeds to step S705.

In step S703, the system control unit 130 acquires the actual focal length variation rate information added to the image data recorded in the memory 107. Then, the processing proceeds to step S704.

In step S704, based on the actual focal length variation rate information, the system control unit 130 calculates the image size correction magnification for correcting the angle-of-view variation due to the focus lens drive. Then, the system control unit 130 controls the image processing unit 140 based on the image size correction magnification to perform the resize processing on the image data recorded in the memory 107. Then, the processing proceeds to step S705.

In step S705, the system control unit 130 displays the image data recorded in the memory 107 on the image display unit 106. Then, the processing proceeds to step S706.

In step S706, the system control unit 130 determines whether the moving image reproduction is to be continued. In a case where the moving image reproduction is to be continued (YES in step S706), the processing returns to step S701. On the other hand, in a case where the moving image reproduction is not to be continued (NO in step S706), the system control unit 130 ends the moving image reproduction processing.

The above-described processing allows the imaging apparatus 100 to achieve the focus image magnification variation correction at the time of moving image reproduction based on the actual focal length variation rate information recorded in the moving image file.

According to the above-described exemplary embodiment, it is possible to transmit from the lens apparatus 150 to the imaging apparatus 100 the actual focal length variation rate information for enabling calculating the amount of angle-of-view variation accompanying the actual focal length variation due to the focus lens drive, and to record the actual focal length variation rate information in a moving image file. This makes it possible to record the moving image file not having undergone the focus image magnification variation correction and perform the focus image magnification variation correction at the time of moving image file reproduction. This also allows a moving image reproduction apparatus other than an imaging apparatus to perform the focus image magnification variation correction.

In this case, the system control unit 130 can determine the attached lens apparatus 150 and control the lens apparatus 150 to select whether to perform an image magnification correction. For example, the system control unit 130 transmits a request for identification information to the lens apparatus 150 and receives the identification information of the lens apparatus 150 as a response to the request. In a case where the identification information includes information indicating that the image magnification correction according to the focal length variation is required, the system control unit 130 can transmit a request for information about the above-described focal length variation to the above-described lens apparatus 150. A lens identifier (ID) is an example of the identification information.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-221284, filed Nov. 16, 2017, which is hereby incorporated by reference herein in its entirety.

What is claimed is:

1. An imaging apparatus to which a lens apparatus having a focus lens is attachable, the image apparatus comprising:
a sensor configured to photoelectrically convert an optical image formed via the lens apparatus, and at least one processor configured to perform the operations of the following units:
a generation unit configured to generate an image based on an image signal output from the sensor;
a control unit configured to control communication with the lens apparatus; and
a correction unit configured to correct a magnification of the image based on information received by the control unit,
wherein the control unit receives information about a focal length variation depending on a maximum focal length out of focal lengths which can be taken depending on a position of the focus lens from the lens apparatus, and
wherein the correction unit corrects the magnification of the image based on the information about the focal length variation, and
wherein the focal length variation is defined by a ratio of a current actual focal length to the maximum focal length.

2. The imaging apparatus according to claim 1, wherein the control unit transmits a request for identification information to the lens apparatus and, transmits a request for information about the focal length variation to the lens apparatus in a case where the identification information of the lens apparatus received as a response to the request includes information indicating that correction by the correction unit is required.

3. The imaging apparatus according to claim 1, wherein the information about the focal length variation is correction information corresponding to the magnification of the image which is to be corrected.

4. The imaging apparatus according to claim 3, wherein the correction information is a ratio of a first focal length corresponding to a current position of the focus lens to a second focal length as a reference out of the focal lengths which can be taken depending on the position of the focus lens.

5. The imaging apparatus according to claim 4, wherein the second focal length is a maximum focal length out of the focal lengths which can be taken depending on the position of the focus lens.

6. The imaging apparatus according to claim 3, wherein the at least one processor is further configured to perform the operations of:
a recording unit configured to record an image generated by the generation unit together with the correction information corresponding to each image, as a moving image file; and
a display unit configured to display the moving image file, wherein the display unit displays a correction image corrected by the correction unit based on the correction information.

7. The imaging apparatus according to claim 1, wherein the information about the focal length variation includes a first focal length corresponding to a current position of the focus lens, and a second focal length as a reference out of the focal lengths which can be taken depending on the position of the focus lens.

8. The imaging apparatus according to claim 7, further comprising a calculation unit configured to calculate, based on the first and the second focal lengths, correction information corresponding to the magnification of the image to be corrected, wherein the correction information is a ratio of the first focal length corresponding to the current position of the focus lens to the second focal length as the reference out of the focal lengths which can be taken depending on the position of the focus lens.

9. The imaging apparatus according to claim 1, further comprising a calculation unit configured to calculate correction information about the magnification of the image to be corrected based on a first focal length corresponding to a current position of the focus lens, and a second focal length as a reference out of the focal lengths which can be taken depending on the position of the focus lens, wherein the information about the focal length variation is information associating each of the first and the second focal lengths with the current position of the focus lens, and wherein the calculation unit calculates the correction information based on the first and the second focal lengths identified from the information about the focal length variation by using information indicating the current position of the focus lens acquired from the lens apparatus via the control unit.

10. The imaging apparatus according to claim 9, wherein the information about the focal length variation is information associating each of the first and the second focal lengths with the current position of the focus lens, a current position of a diaphragm, and a current position of a zoom lens, and wherein the calculation unit calculates the correction information based on the first and the second focal lengths identified from the information about the focal length variation by using information indicating the current position of the focus lens, information indicating the current position of the diaphragm, and information indicating the current position of the zoom lens acquired from the lens apparatus via the control unit.

11. The imaging apparatus according to claim 1, wherein the control unit receives the information about the focal length variation at a timing corresponding to an exposure center of the sensor.

12. The imaging apparatus according to claim 1, wherein the control unit receives the current position of the focus lens, the current position of the diaphragm, and the current position of the zoom lens at the timing corresponding to the exposure center of the sensor.

13. The imaging apparatus according to claim 1, further comprising a recording unit configured to record a correction image corrected by the correction unit as a moving image file.

14. A lens attachable to an imaging apparatus, the lens apparatus comprising:
an optical system including a focus lens, and at least one processor configured to perform the operations of
a control unit configured to control communication with the imaging apparatus:
wherein the control unit transmits information about a focal length variation,
wherein the focal length variation is defined by a ratio of a current actual focal length to a maximum focal length out of focal lengths which can be taken depending on a position of the focus lens.

15. The lens apparatus according to claim 14, wherein the at least one processor is further configured to perform the operations of a calculation unit configured to calculate correction information corresponding to a magnification of an image output by a sensor included in the imaging apparatus to be corrected based on a first focal length corresponding to a current position of the focus lens and a second focal length as a reference out of the focal lengths which can be taken depending on the position of the focus lens.

16. The lens apparatus according to claim 15, wherein, in a case where the control unit transmits identification information including information indicating that an image magnification correction is required upon reception of a request for identification information of the lens apparatus, the control unit transmits the correction information upon reception of a request for the correction information.

17. The lens apparatus according to claim 15, wherein information about the focal length variation is correction information corresponding to the magnification of the image to be corrected.

18. The lens apparatus according to claim 17, wherein the correction information is a ratio of the first focal length corresponding to the current position of the focus lens to the second focal length as a reference out of the focal lengths which can be taken depending on the position of the focus lens.

19. The lens apparatus according to claim 15, wherein the calculation unit calculates the correction information based on the first and the second focal lengths identified by using information indicating the current position of the focus lens.

20. The lens apparatus according to claim 15, wherein the calculation unit calculates the correction information based on the first and the second focal lengths identified from information about the focal length variation by using information indicating the current position of the focus lens, information indicating a current position of the diaphragm, and information indicating a current position of the zoom lens.

21. The lens apparatus according to claim 20, wherein the control unit receives the current position of the focus lens, the current position of the diaphragm, and the current position of the zoom lens at the timing corresponding to the exposure center of the sensor.

22. The lens apparatus according to claim 15, wherein the second focal length is a maximum focal length out of focal lengths which can be taken depending on a position of the focus lens.

23. The lens apparatus according to claim 15, wherein the control unit transmits the correction information at timing corresponding to an exposure center of the sensor.

24. A method for controlling an imaging apparatus to which a lens apparatus is attachable, the imaging apparatus having a sensor configured to photoelectrically convert an optical image formed via the lens apparatus, the lens apparatus having a focus lens, the method comprising:
generating an image based on an image signal output from the sensor;
controlling communication with the lens apparatus; and
correcting a magnification of the image based on information received in the controlling,
wherein, in the controlling, information about a focal length variation depending on a maximum focal length out of focal lengths which can be taken depending on a position of the focus lens is received from the lens apparatus, and
wherein, in the correcting, the magnification of the image is corrected based on the information about the focal length variation, and
wherein the focal length variation is defined by a ratio of a current actual focus length to the maximum focal length.

25. A method for controlling a lens apparatus having an optical system including a focus lens, which can be attached to an imaging apparatus, the method comprising:
controlling communication to transmit information about a focal length variation,
wherein the focal length variation is defined by a ratio of a current actual focal length to a maximum focal length out of focal lengths which can be taken depending on a position of the focus lens.

* * * * *